July 5, 1927.
C. E. ALLISON
1,634,529
HOISTING APPARATUS
Filed June 1, 1925
3 Sheets-Sheet 2
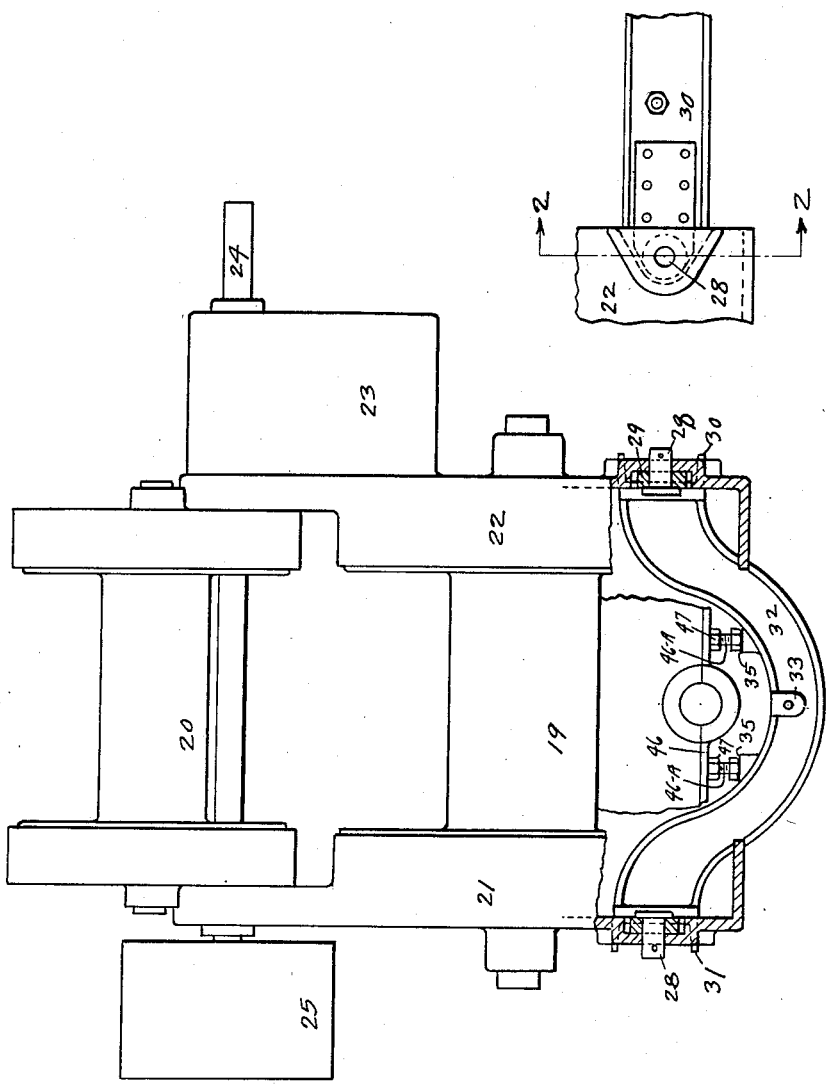
Inventor
C. E. ALLISON.
By E. B. Birkenbeul
Attorney July 5, 1927.
C. E. ALLISON
1,634,529
HOISTING APPARATUS
Filed June 1, 1925
3 Sheets-Sheet 3
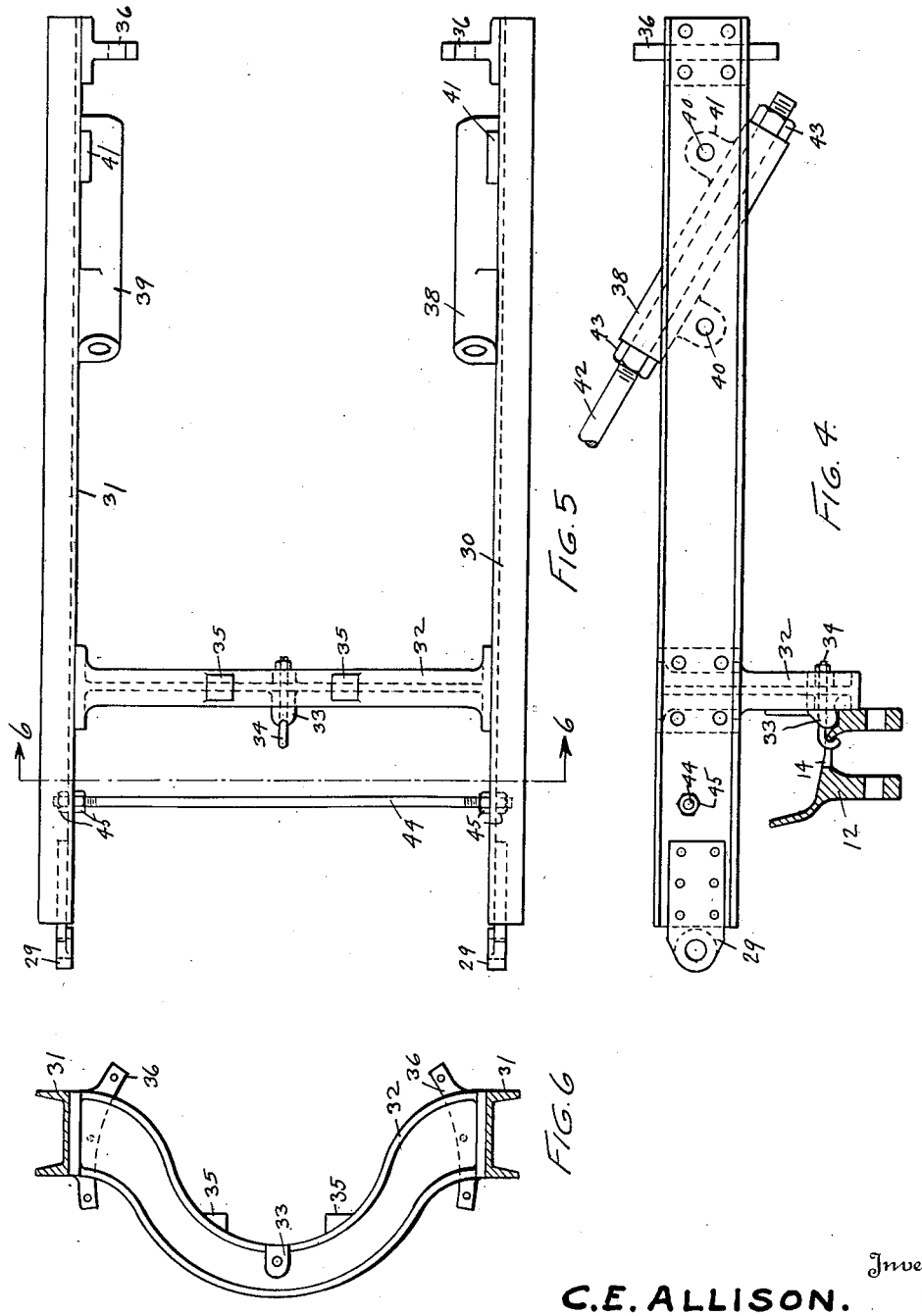
C.E. ALLISON. Inventor
By C.B. Birkenbeuel
Attorney Patented July 5, 1927.

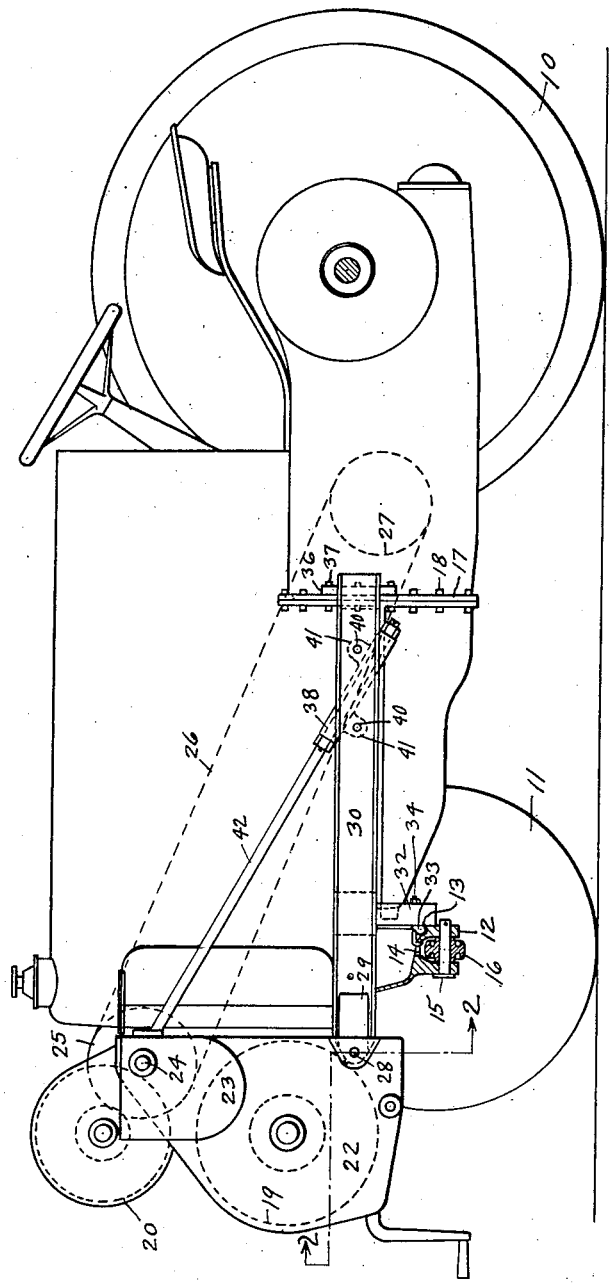

1,634,529

UNITED STATES PATENT OFFICE.

CLIFFORD E. ALLISON, OF PORTLAND, OREGON, ASSIGNOR TO WILLAMETTE IRON AND STEEL WORKS, OF PORTLAND, OREGON.

HOISTING APPARATUS.

Application filed June 1, 1925. Serial No. 33,931.

This invention relates generally to tractors which are used for hoisting and hauling purposes, and particularly to a special type of light tractor now in common use.

The first object of this invention is to provide a special form of hoist and frame for attaching same to a tractor or removing same therefrom with extreme ease and rapidity, and without requiring any alterations in the tractor itself.

The second object is to provide a very rigid supporting connection between the hoist and tractor and to support the hoist directly upon the front axle of the tractor, without transmitting stresses through the frame of the tractor itself or subjecting parts of the tractor to loads which these parts were not designed to carry.

The third object is to provide a hoisting attachment for tractors which will be readily marketable owing to its ease of installation and satisfactory operation after being installed.

The fourth object is to provide a convenient and direct means for tensioning the belt and bracing the winch with relation to the tractor itself.

These, and other objects, will become more apparent from the specification following as illustrated in the accompanying drawings, in which:

Figure 1 is a side elevation of the device showing same applied to a tractor. Figure 2 is a transverse section taken along the lines 2—2 in Figures 1 and 3 showing the drums in elevation. Figure 3 is a fragmentary elevation of the hinged joint between the winch and the attachment frame. Figure 4 is a detailed side elevation of the attachment frame of which Figure 5 is a plan and Figure 6 is a vertical transverse section taken along the line 6—6 in Figure 5.

Similar numbers of reference refer to the same parts throughout the several views.

Referring in detail to the drawings, there is illustrated the outline of the type of tractor for which this device is especially intended, including the drive wheels 10 and front wheels 11 which are mounted on the front axle bracket 12. The front axle bracket 12, as manufactured, is provided with a flat spot 13 on its upper side and an opening 14. The pin 15 attaches the bracket 12 to the front axle 16. The tractor frame is provided with flanges 17 which are joined by the bolts 18.

Turning now to the device itself it will be seen to include a two drum winch and a frame for attaching the winch to the tractor. It is in this special form of frame that the novelty of this device resides.

The winch itself consists of a lower drum 19 and an upper drum 20 which are mounted between the winch frames 21 and 22. Suitable reduction gears are contained in the housing 23 to which power is supplied through the shaft 24 which carries the pulley 25 whose belt 26 is driven from the tractor pulley 27.

The winch frames 21 and 22 are hinged by means of the pins 28 to the frame ends 29 which are secured to the attachment side frames 30 and 31, between which is bolted the U-shaped cross tie 32 having formed on its forward side a projecting lug 33 through which passes a hook bolt 34. The lug 33 is adapted to rest on the flat spot 13 and the hook bolt 34 hooks into the bracket 12 through the opening 14.

On the inner side of the U-shaped cross tie 32 are formed the flat bosses 35 whose function will be explained later.

At the rear end of the frames 30 and 31 are secured the curved brackets 36 which are attached to the flanges 17 by means of the bolts 37 which replace three of the usual bolts 18 on each side of the tractor.

On the inner sides of the members 30 and 31 are secured the brackets 38 and 39 by means of the rivets 40 which pass through the ears 41 and the frames 30 and 31.

Brace rods 42 are fastened to the upper portions of the frames 21 and 22 and pass through the brackets 38 and 39 in which they are held by the nuts 43. A tie rod 44 is placed between the frames 30 and 31 to which it is secured by the nuts 45. Two cap screws are removed from the under side of the forward end of the crank case 46 and in their places are put the longer cap screws 46$^A$ provided with nuts 47. The heads of the screws 46$^A$ rest firmly against the bosses 35.

The steps required to install this device on the tractor are as follows: The bolts 18 are removed from each side of the flanges 17 and the side frames 30 and 31 with their attached parts are slipped into place with the lug 33 resting on the flat spot 13. The curved brackets 36 are now attached to the flanges 17 by means of the long bolts 37. The hook bolt 34 is now inserted into the opening 14 and its nut tightened. The cap screws 46^A are now screwed down against the bosses 35 and their nuts 47 are tightened against the crank case.

The winch itself is now put into place and secured by means of the pins 28 and the rods 42, which latter serve not only to hold the winch frame in rigid relation to the attachment frames 30 and 31, but also can be employed to serve as belt tensioners.

By the above described construction the winch is carried directly upon the front axle of the tractor instead of being carried in a round-about manner through various members of the tractor. It can be seen that the work of installing this device or removing it is reduced in a very large degree, and is made a task requiring no alteration in the tractor and the employment of little skill and few tools.

I am aware that winches have long been mounted on tractors and other vehicles; I therefore do not intend to cover such devices broadly, but I do intend to cover all such forms and modifications thereof as fall fairly within the appended claims.

I claim:

1. In a hoisting apparatus, the combination of a tractor including a tractor frame and front axle bracket with a pair of attachment frames rigidly attached to the sides of said tractor frame, said attachment frame having a downwardly arching tie uniting the forward ends of said attachment frame, said tie having a forwardly projecting lug adapted to rest on said axle bracket; and means for holding said lug in position on said axle bracket.

2. In a hoisting apparatus, the combination of a tractor frame and front axle bracket with a pair of attachment frames rigidly secured to the sides of said tractor frame; a cross tie between the forward ends of said attachment frames having means for supporting said cross tie on the front axle bracket of said tractor; and a hook bolt for holding said cross tie in a fixed relation to said axle bracket.

3. In a hoisting apparatus, the combination of a tractor having a front axle pivotally mounted under its front axle bracket with a pair of spaced lateral attachment frames rigidly secured at their rearward ends to the sides of the tractor frame; a downwardly arching cross tie secured between the forward ends of said frame having a projecting lug formed on the forward side of said cross tie adapted to rest in a recess in said axle bracket; a hook bolt passing through said tie engaging said bracket; and means for preventing said lug from being raised off of its seat.

4. An attachment frame for mounting a winch on the forward end of a tractor consisting of a pair of lateral attachment frame members whose rearward ends are adapted to be secured to the flanged sides of a tractor frame; a downwardly extending arched cross tie uniting the forward ends of said attachment frame, said cross tie having a forwardly projecting lug formed thereon; a hook bolt passing through said cross tie over said lug; bolts for holding said lug downwardly against its support; and means for attaching a winch on the forward end of said attachment frame.

CLIFFORD E. ALLISON.